3,211,281
CONTACT LENS STORAGE MEANS
Reuben Fred Speshyock, 3221 Mills Ave., La Crescenta, Calif., and John G. Swinford, Buena Park, Calif.; said Swinford assignor to said Speshyock
Filed Sept. 27, 1960, Ser. No. 58,705
10 Claims. (Cl. 206—5)

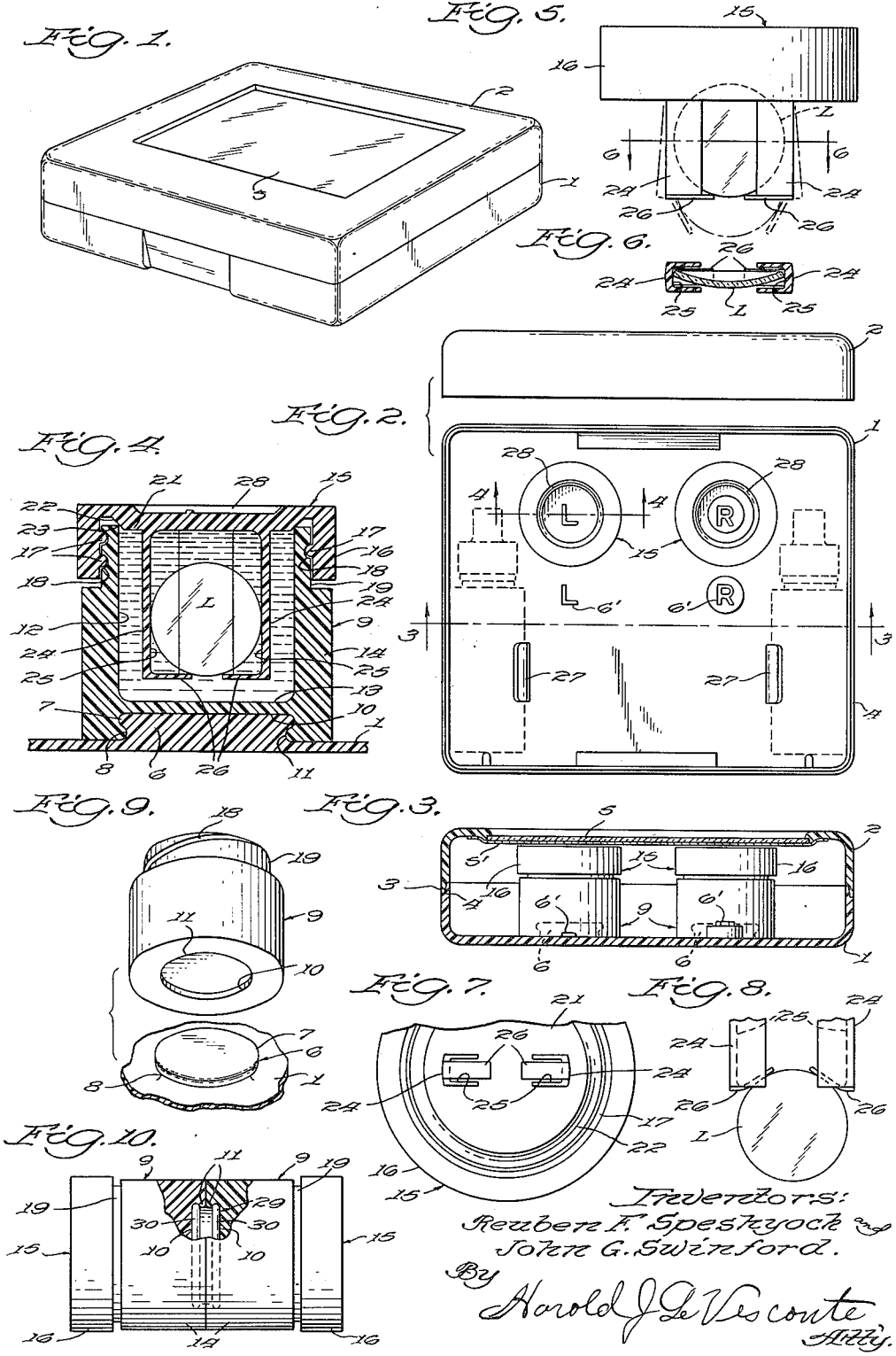

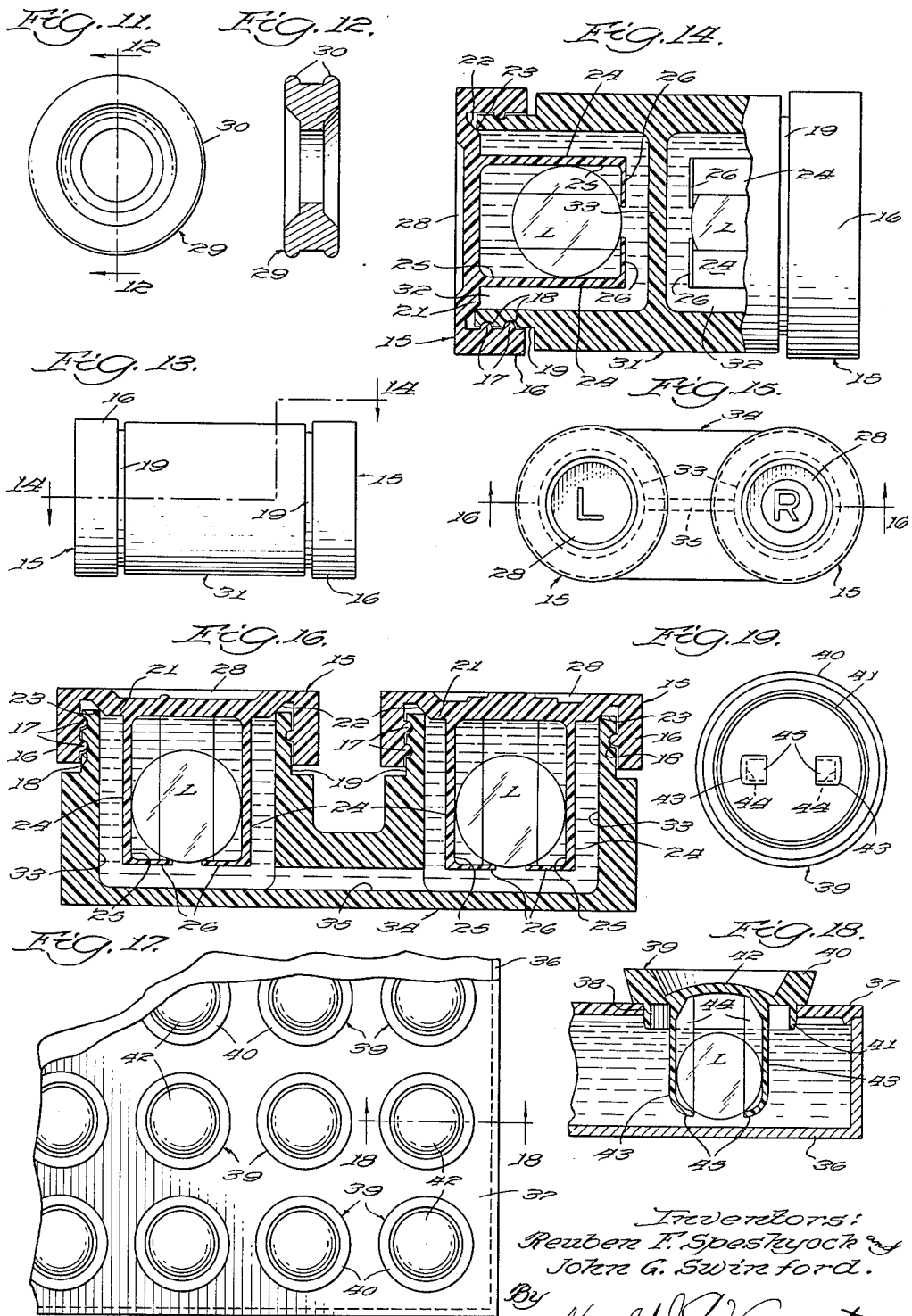

This invention is concerned with the storage of contact lenses when not being worn.

Contact lenses are thin, carefully shaped, shallow, bits of transparent plastic material having a concavo-convex configuration of such curvature as to serve as a suitable lens for the eye of the user and when these lenses are not being worn, they must be carefully stored under conditions which will maintain them in usable condition. Thus the storage means must protect the lens against any distorting force, against any marring or scratching of the surface, against drying out with resultant "crazing" of the surface, and against the liability of contact of any bacteria or fungus which might thus be transmitted to the eye. At the same time, the storage means must be such as to render the lens readily accessible for application and as readily stored and, above all, must possess means by which the used by tactile identification alone may determine which lens goes into which eye or which lens upon being stored is to be stored in a particular holding means, it being remembered that many users when not wearing the contact lenses, are nearly sightless. Accordingly, these demands dictate, first of all, the use of a holding means which is formed of a material which is softer than the material from which the lens is formed so that any contact between the lens and the holding means cannot possibly result in any marring of the lens surface. Moreover, the means by which the lens is held or retained is preferably so shaped that (a) no surface of the lens essential to sight is in danger of being contacted by the holding means, (b) the lens is readily grasped for removal from the holding means without the need of sight, (c) the lens is as readily placed in the holding means without the need for sight and (d) when placed in the holding means, the lens is automatically held against unintentional removal therefrom.

This holding means for the lens, as will be disclosed in detail, is so constructed as additionally, to constitute a closure means for a container of fluid in which the lens is immersed when this combined container closure means and lens holding means is applied to the container. The fluid in the container serves to keep the lens surface wetted against drying out and "crazing" and contains an antiseptic agent to keep the lens in a sterile condition.

However, when, as in this invention, the lens is loosely held or retained by the holding means, a further novel advantage is realized. The specific gravity of the lens material is that of acrylic plastic or about 1.18. The fluid ordinarily employed in the container is substantially of a slightly saline composition, resembling natural tears, with the addition of the said antiseptic component and thus has a specific gravity slightly greater than 1.00. Thus, the lens is confined in a fluid which is of almost the same specific gravity as the lens material and is thus, in effect, caused to float within the container and within the space of movement allowed by the holding means. The viscosity of the fluid and the wetting characteristics of the fluid and the lens and of the holding means is such as to create a film of fluid between all adjacent surfaces of the lens and the holding means so that except for momentary slight contact incident to insertion and removal of the lens from the holding means, the lens is actually maintained out of physical contact with the holding means while immersed in the fluid.

With the foregoing considerations in mind, the principal object of the invention is to provide a storage means for contact lenses in which the lens holding means is such as not to contact any surface of the lens through which vision occurs.

Another object of the invention is to provide a contact lens storage device comprising a holding means which also forms the closure means for the container of fluid in which the lens is immersed and stored, which is formed from material which is both unaffected by the fluid in the container and which is softer than the lens material while having sufficient rigidity to serve both as the closure means for the container and as the holding means for the lens.

A further object of the invention is to provide a holder for a contact lens adapted to maintain the lens immersed in fluid and which is so shaped as to accommodate a wide range of diameters of contact lenses.

Still another object of the invention is to provide a containing means for a contact lens comprising a pair of fluid containers each having a lens holding closure means and each provided with exterior mounting means for optionally securing said containers in a carrying case or to a connector whereby the containers form a unit.

A still further object of the invention is to provide a fluid container closure means with a holding means for a contact lens which is adapted to be used on a wide variety of fluid containers and which, when removed from the container, may be inverted to present the lens holding portion thereof readily accessible for removal or insertion of a lens.

Still another object of the invention is to provide a leakproof seal for the closure means of the fluid containing cavity of the contact lens container.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a perspective view of a case in which the first embodiment of the invention is contained, FIG. 2 is an exploded plan view of the case shown in FIG. 1 with the cover removed, FIG. 3 is a transverse sectional view of the case and contents taken on the line 3—3 of FIG. 2, FIG. 4 is a greatly enlarged, fragmentary, medial sectional view of a container within the case as taken on the line 4—4 of FIG. 2, FIG. 5 is a side elevational view of a combined closure means and lens holding means used in the preceding figures showing a lens held therein in full lines and showing also in dotted lines the displacement of certain leaf elements incident to removing the lens, FIG. 6 is a transverse sectional view taken on the line 6—6 of line 5, FIG. 7 is a fragmentary bottom plan view of the closure and lens holder shown in FIG. 5, the lens being omitted, FIG. 8 is a fragmentary side elevational view of the lens holding portion of the closure means showing the beginning of the entry of a lens therein, FIG. 9 is a perspective, exploded view showing the means for mounting the fluid containers in the case shown in the FIGS. 1, 2 and 3, FIG. 10 is a side elevational view, partly in section showing the containers of the preceding figures removed from the case and interconnected by a connector means engaging the recessed bottom surfaces of the containers, FIGS. 11 and 12, are, respectively, enlarged side elevational and transverse medial sectional views of the connector shown in FIG. 10, FIG. 13 is a side elevational view of a second embodiment of the invention comprising a two compartment container having the opposite ends thereof enclosed by container closure and lens holding means such as shown in the preceding figures, FIG. 14 is an enlarged scale, sectional view taken on the staggered line 14—14 of FIG. 13, FIG. 15 is a top plan view of a third embodiment of the invention comprising a unitary container having separately closed, lens housing cavities arranged in side by side relation with a passage interconnecting the cavities, whereby, a single body of fluid bathes both lenses, the lens holding means being of the type shown in the preceding figures, FIG. 16 is an enlarged, medial sectional view taken on the line 16—16 of FIG. 15, FIG. 17 is a fragmentary plan view of a final embodiment of the invention as adapted for storage of a quantity of lenses as by a dealer, optometrist, or the like, FIG. 18 is an enlarged fragmentary sectional view taken on the line 18—18 of FIG. 17, and FIG. 19 is a bottom plan view of the lens holding means shown in FIGS. 17 and 18.

Referring first to FIGS. 1 through 9, there is shown a shallow, rectangular case comprising a bottom portion 1 and a removable cover 2 having a peripheral flange portion 3 engaging a mating recess 4 in the base 1 extending around the edges of the case. In the illustrated embodiment of the invention, the base and cover are formed as plastic moldings and preferably, the top face of the cover is provided with a mirror 5 held therein by a backing panel 5' cemented or otherwise attached to the under face of the cover as best shown in FIG. 3.

Along one side edge thereof, the inner face of the base 1 is provided with a pair of circular bosses 6 having the upper periphery thereof rounded to form a rim portion 7 and the lower portion of the periphery of said bosses is defined by peripheral rounded groove 8, whereby the rim 7 overhangs the said lower portion of the boss as best shown in FIG. 4. The bottom of the case adjacent the bosses 6 is provided with the letters R and L to indicate right and left hand as at 6' and the letter R being disposed on a raised surface for ready tactile identification.

Detachably mounted on the bosses 6, 6 are the cylindrical fluid containers 9, 9. These containers are formed of moldings of slightly resilient plastic and are each provided with a circular recess 10 in the bottom thereof providing a resilient socket for one or the other of the bosses 6, the outermost portion of the recess providing a rounded lip portion 11 engaging the groove 8. The proportionate diameters of the peripheral surfaces of the bosses 6 and recess 10 are such that due to the resilience of the plastic material forming the containers, these containers are detachably snapped on and off of the bosses 6. The fluid containing compartment 12 of the containers is bounded by the bottom 13, the side wall 14, and the removable cap 15.

The cap is preferably formed from similarly resilient plastic material and which is softer than the material from which the contact lens is formed. The cap includes a depending annular skirt or flange 16 provided on an inner face thereof with threads comprising a helically disposed rib 17. The container side wall 14 at the open outer end thereof is provided with a mating helical groove 18 formed in the outer face of the reduced diameter end 19 of the side wall adapted to be engaged by the thread or rib 17 on the cap. The inner end face of the cap is provided with a shallow, axially, disposed boss 21 defined by a sloping peripheral face 22 engaging the corner 23 formed by the juncture of the inner surface of the container wall with the end face and to effect a fluid tight seal with said cover.

The lens holding means shown in FIGS. 1–16 comprises laterally spaced, thin walled, retainer members 24, 24 projecting parallel to the axial line of the cap 15 from the inner face thereof and having opposing grooves 25, 25 formed on the adjacent faces thereof and also extending parallel to the axial line of the cap; the bottoms of said grooves being spaced from each other a distance slightly greater than the largest diameter of contact lens in the range accommodated by said holder (preferably about 2 mm.) and the inner faces of the retainers in which the grooves are formed being spaced from each other a distance less than the smallest diameter of contact lens in said range whereby all diameters of contact lens in a given range may be inserted in the said grooves. As shown in FIG. 6, the width of the grooves 25, 25 is slightly greater than the width of the portions of the lens confined therein, wherefore, the lens is retained with capacity for relative movement in the holding means and is not subjected to any stress by the holding means. The outer or distal ends of the grooves 25, 25 are yieldingly closed by thin, resilient leaves 26, 26 molded integrally with the cap and retainers and said leaves project from the bottom of the grooves 25, 25 laterally toward each other; said leaves being of slightly less width than the grooves. When a lens L is inserted, these leaves deflect inwardly into the grooves 25, 25 as shown in FIG. 8 until the lens passes beyond the leaves which then resume their normal position supporting the lens within the grooves when the cap is positioned with the members 24, 24 extending downwardly therefrom. Incident to removal of the lens, the leaves 26, 26 are momentarily displaced outwardly as indicated in dotted lines lower portion of FIG. 5. With the larger sizes of lens in the range, the portion of the leaves flexed by the lens may oppose the lens edge. The thin wall construction of the retainers will then allow the retainers to spring outwardly to allow the exit of the lens as shown in dotted lines in FIG. 5. Since the cap material is softer than the lens material and engages only the edges of the lens, the danger of scratching the lens surfaces is, for all practical purposes, eliminated. The outer end faces of the caps 15, 15 may be provided with axially disposed recesses 28, 28 in which integrally formed indicia means similar to that shown on the case bottom at 6', is disposed. Additionally, the case may be provided with resilient clips 27, 27 for holding bottles in which reserve supplies of fluid are contained.

Referring next to FIGS. 10, 11 and 12, there is shown a modification of the invention in which the containers of the type mounted in the case are removed from the case and are interconnected by a connector element 29 comprising a metal ring formed from rigid plastic or metal and provided with laterally spaced peripheral rim portions 30 engaging the recesses of the pair of containers with the ends thereof abutting. The resulting package is more compact and hence preferred by some users although the advantage of extra fluid supply is absent.

Further simplification is shown in the form of the invention illustrated in FIGS. 13 and 14 in which the container 31 is formed as a single molding of a plastic of the type previously referred to and having axially aligned, cylindrical cavities 32, 32 separated by a partition 33. The outer ends of the container are provided with threads 18, 18 to engage the threads 17 of a pair of caps 15, 15 which close the container. This provides a simpler and cheaper container component than the previous form at the expense of the adaptability of the said first form of the container for optional mounting in a case or on a connector as has previously been explained.

FIGS. 15 and 16 disclose a third embodiment of the invention in which the lens holding caps 15, 15 are mounted to close fluid containing cavities 33', 33' disposed side by side in a container body member 34 and in which the said cavities are interconnected by fluid channel 35. It will be particularly noted that all of the foregoing embodiments of the invention utilize the same lens holding cap element 15.

FIGS. 17, 18 and 19 show still another embodiment of the invention and another form of lens holding element. This embodiment of the invention involves storage means for quantities of contact lenses as would be kept by optometrists, dealers, prescription opticians, and the like. In this form of the invention, the fluid container is in the form of a large shallow tray 36 having a cover 37 fitting thereon; said cover having a plurality of holes 38 therein for reception of a series of lens holding means 39. The illustrated lens holding means is formed from soft, resilient plastic and comprises a thick annular rim 40 from the under side of which a thin annular flange 41 depends for frictional engagement with the holes 38 in the cover 37. The rim portion surrounds a relatively thin, upwardly domed concavo-convex central web portion 42 from the concave side of which the opposed lens retaining members 43, 43 depend in spaced, parallel relation; said members having lens edge engaging grooves 44, 44 formed in the adjacent faces thereof and the grooves being of sufficient depth to hold lenses of different diameters within a given range of, say, 2 mm. The lower ends of the grooves 44, 44 are closed by integrally formed partitions 45, 45 instead of by the resilient flaps or leaves 26 shown in the first described form of lens holder and container closure. To insert or remove a lens from this last described form of the holding means, the rim 40 is held between the first and second fingers and the domed web portion is pressed downwardly by the thumb. This causes the members 43, 43 to spread apart at their lower ends a distance sufficient to allow a lens to be inserted or removed from between the retaining members. Upon releasing the pressure on the domed web, the resilience thereof will return it to its normal shape and the members 43, 43 to their parallel, lens holding position. It will be understood that this last described means for holding and releasing a lens may be used with the screw thread lens holder attaching means and that the first described lens holding means may be employed with the friction fit container engaging flange means above described if desired.

While the foregoing specification has disclosed certain presently preferred embodiments of the invention by way of example, it will be understood that the invention is not to be deemed to be limited to the embodiments thus disclosed, and that the invention includes as well, all such changes and modifications in the parts, and in the construction, combination and arrangement of parts as shall come within the purview of the appended claims.

We claim:

1. A contact lens holding means for a contact lens storage means; said holding means comprising a body portion adapted to serve as a closure for a container of fluid in which a lens held in said holding means is to be immersed, and lens retaining elements carried by said body portion and comprising a pair of spaced, parallel members depending from said body portion and each of said members having a contact lens edge receiving groove extending longitudinally along the side thereof adjacent the other of said members; said members being so spaced from each other that the front and back surfaces of the center portion of a lens held therein is exposed for manual engagement and said grooves having a width and depth sufficient to receive a predetermined range of diameters of contact lenses, therein with capacity for unstressed relative movement and displaceable lens supporting means normally effective to maintain said grooves closed at the end thereof remote from said body portion.

2. A contact lens holding means as claimed in claim 1 in which said body portion is provided with a threaded surface adapted to detachably engage a mating thread on a container of fluid in which a lens held in said holding means is to be immersed.

3. A conact lens holding means as claimed in claim 1 in which said body portion is formed with a resilient, cylindrical exterior surface detachably, frictionally engageable with an opening in a container of fluid in which a lens held in said holding means is to be immersed.

4. A contact lens holding means as claimed in claim 1 in which at least said lens engaging elements and said displaceable lens supporting means are formed from a resilient material which is softer than the contact lens material.

5. A contact lens holding means as claimed in claim 1 in which said displaceable lens supporting means comprises a pair of integrally formed, resilient leaf elements normally closing the ends of one each of said grooves remote from said body portion.

6. A pair of lens holding means as claimed in claim 1 and container means associated therewith; said container means comprising a single unit having two separate fluid containing cavities each having an opening closed by one each of said lens holding means.

7. A pair of lens holding means as claimed in claim 1 and a pair of separate container components associated one each with each of said lens holding means; each of said containers having a socket means on the exterior surface thereof, and a connector means detachably engaging the socket means of both of said container components to combine said container components and said holding means into a single unit.

8. A contact lens holding means formed from a resilient plastic material and comprising a body portion including a heavy peripheral rim surrounding an integrally formed, relatively thin, concavo-convex center web portion, and an integrally formed lens holding means projecting from the concave side of said center portion comprising spaced parallel members having lens edge receiving grooves on the adjacent sides thereof; said grooves being closed at the ends thereof remote from said center portion; said members being so spaced from each other and said grooves being of a depth to accommodate a range of diameters of contact lens; said parallel members upon flattening distortion of said concavo-convex center web portion being caused to spread apart for the engagement or disengagement of a contact lens edge with said grooves.

9. A contact lens holding means as claimed in claim 8 in which said body portion includes means for closing engagement with an opening in a container of fluid in which a contact lens held in said members is to be immersed.

10. A storage means for a contact lens comprising a fluid holding container having an opening disposed above the level of fluid contained therein, a removable closure means for said container opening, and a contact lens holding means in which a lens is manually inserted and removed; said holding means being formed as a part of said closure means and being so disposed thereon as to extend into the container when said closure means is applied to the container opening; said holding means comprising opposed elements for loosely engaging the periphery of a lens inserted therebetween at diametrically opposite points on the lens; said elements being spaced from each other a distance sufficient to expose opposed side areas of a lens for manual grasping incident to inserting the lens between said elements or for removing a lens therefrom.

References Cited by the Examiner

UNITED STATES PATENTS

| 2,163,862 | 6/39 | Wing. | |
| 2,288,532 | 6/42 | Knapp | 220—231 |
| 2,622,607 | 12/52 | Carlson | 206—1 |
| 2,643,661 | 6/53 | Shanahan | 206—1 |
| 2,648,344 | 8/53 | Randolph | 206—1 |
| 2,932,383 | 4/60 | Fagan | 206—5 |
| 2,948,387 | 8/60 | Fishman | 220—23.8 |
| 3,025,950 | 3/62 | Nathan | 206—5 |

THERON E. CONDON, *Primary Examiner.*

EARLE J. DRUMMOND, *Examiner.*